(12) United States Patent
McGehearty et al.

(10) Patent No.: US 6,446,157 B1
(45) Date of Patent: *Sep. 3, 2002

(54) CACHE BANK CONFLICT AVOIDANCE AND CACHE COLLISION AVOIDANCE

(75) Inventors: Patrick McGehearty, Dallas; Kevin R. Wadleigh, Plano; Aaron Potler, Dallas, all of TX (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,010

(22) Filed: Sep. 20, 1999

Related U.S. Application Data

(63) Continuation of application No. 08/991,196, filed on Dec. 16, 1997, now Pat. No. 6,029,225.

(51) Int. Cl.[7] .................................. G06F 12/00
(52) U.S. Cl. ................. 711/5; 711/118; 711/127; 365/230.04
(58) Field of Search ................. 711/5, 157, 127, 711/131, 140, 211; 365/230.03, 230.04, 233; 712/23, 215, 206; 710/54, 36

(56) References Cited

U.S. PATENT DOCUMENTS

| 5,261,064 A | * | 11/1993 | Wyland | 711/211 |
| 5,559,986 A | * | 9/1996 | Alpert et al. | 711/144 |
| 5,673,233 A | * | 9/1997 | Wright et al. | 365/233 |
| 5,796,977 A | * | 8/1998 | Sarangdhar et al. | 709/1 |
| 5,802,588 A | * | 9/1998 | Ramagopal et al. | 711/156 |
| 5,832,297 A | * | 11/1998 | Ramagopal et al. | 710/5 |
| 5,904,732 A | * | 5/1999 | Greenley et al. | 710/57 |
| 5,953,738 A | * | 9/1999 | Rao | 711/105 |
| 6,202,139 B1 | * | 3/2001 | Witt et al. | 711/169 |

* cited by examiner

Primary Examiner—Do Hyun Yoo
Assistant Examiner—Nasser Moazzami

(57) ABSTRACT

The inventive mechanism determines whether memory source and destination addresses map to the same or nearly the same cache address. If they map to different addresses, then loads and stores are ordered so that loads to one cache bank are performed on the same clock cycles as the stores to another cache bank. After a group of loads and stores are completed, then load and store operations for each bank are switched. If the source and destination addresses map to nearly the same cache address and if the source address is prior to the destination address, then a group of cache lines is loaded into registers and stored to memory without any interleaving of other loads and stores. If the source and destination addresses map to the same cache location, then an initial load of data into registers is performed. After that, additional loads are interleaved with non-cache conflicting stores to move new values into memory. Thus, loads and stores to matching cache addresses are separated by time.

13 Claims, 2 Drawing Sheets

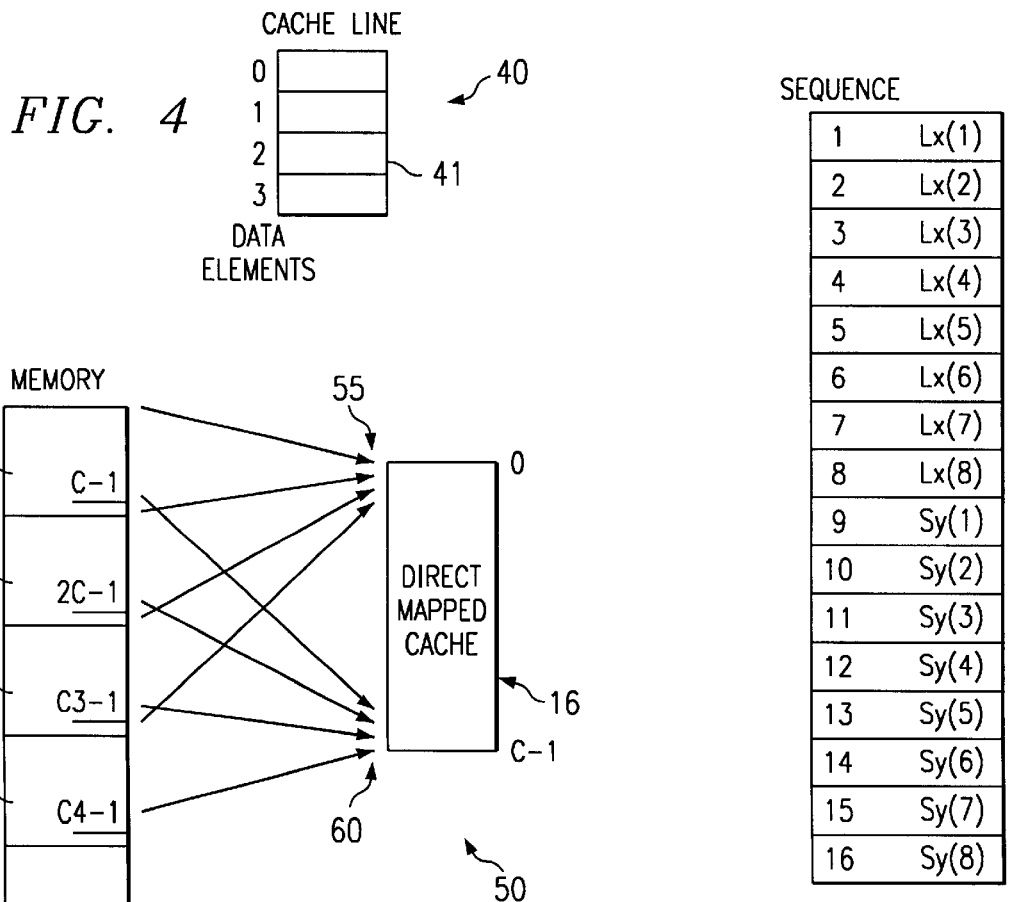

CACHE BANK CONFLICT AVOIDANCE AND CACHE COLLISION AVOIDANCE

CROSS REFERENCE TO RELATED APPLICATION(S)

This is a continuation of application Ser. No. 08/991,196 filed on Dec. 16, 1997, now U.S. Pat. No. 6,029,225, which is hereby incorporated by reference.

TECHNICAL FIELD OF THE INVENTION

This application relates in general to data caches for computer systems, and in specific to the movement of data into and out of the caches.

BACKGROUND OF THE INVENTION

Prior art computer systems have assorted problems with data movement into and out of cache. When these problems occur system performance is drastically curtailed.

One problem is cache bank conflicts which relates to the number of stores to cache that can be executed in a clock cycle. Many prior art computer systems allow a maximum of one load and one store to be executed per clock cycle. To perform a store, data is moved from a processor register to a store queue and then to data cache. If the store queue fills up, the processor stalls and system performance is reduced.

Some prior art systems also have an implementation constraint where a store immediately following a load to the same cache bank incurs additional delay as compared to any other combination of loads and stores to the cache banks. Prior art commonly interleaves loads and stores so the store queue cannot empty to cache as efficiently as desired causing performance degradation.

If the alternative loads and stores are used where the loads and stores are on the same cache line, a cache miss will occur on every load and store, and thus overlapping cannot be used. A cache miss occurs when the data to be loaded is not in the cache, but is in the main memory.

Another problem is cache collision. A cache collision occurs when two memory addresses map to the same cache address. Typically, a cache has a much smaller address space than the full memory, such that there are many to one mapping, i.e. many real memory addresses map to the same cache address. For example, if there are 1 million entries in the cache and 100 million entries in the main memory, then 100 main memory entries map to every cache entry. A typical mapping for a direct mapped cache may be memory addresses 1, 1 million+1, 2 million+1, etc., all map to cache address 1. Memory addresses 2, 1 million+2, 2 million+2, etc. all map to cache address 2. Therefore, when a data copy is performed where the source and destination addresses are exactly a multiple of the cache size apart, cache collisions will occur. Cache thrashing is where repeated cache collisions occur. There are two important special cases where cache thrashing occurs. The first is where two Unix processes, which share a parent process, are attempting to communicate by means of Unix supported shared memory. The process allocates shared memory for similar purposes at similar times. Thus, their data buffers for copying often have the same logical addresses, and map to the same cache lines. The second case occurs when two large arrays of data that are used in a computation are declared together, and the user declared them to be a multiple of the cache size. Then similar indexes in the arrays will map to the same cache lines. In other words, if array size is declared to be exactly one million, and the array is going to be copied to another array, also of size one million, then the array will systematically copy on to the same cache address. The effects of a cache collision is the loss of data, as the data is overwritten before the data is finished being used by the system. Moreover, a typical protocol will involve a mix of loads and stores for the two arrays. Each access for either array will wipe out several pieces of information for the other array. Moreover, the parallel operations mean that an exact address match does not have to occur before a cache collision occurs, the addresses can be close to each other and a cache collision will still occur. Thus, when data is to be copied and the source and destination address are nearly the same, but not exactly the same, performance is still reduced by cache collisions. Prior solutions do not make special provisions for handling nearly aligned source and destination addresses.

Thus there is a need in the prior art for a mechanism which maintains the store queue nearly empty, while minimizing both cache bank conflicts and cache collisions.

SUMMARY OF THE INVENTION

These and other objects, features and technical advantages are achieved by a system and method which determines if the memory source and destination addresses have nearly matching cache addresses or exactly matching cache addresses. If the source and destination addresses have different cache addresses then the data flow into and out of the cache operates in an enhanced mode. If the source and destination addresses have nearly matching cache addresses then the data flow into and out of the cache operates in a near cache collision avoidance mode. If the source and destination addresses have exactly matching cache addresses then the data flow into and out of the cache operates in an exact cache collision avoidance mode.

The enhanced mode of cache bank conflict avoidance carefully orders loads and stores so that loads to one memory bank are performed on the same clock cycles as the stores to the other memory bank. After a group of loads and stores are completed, then operations for each bank are switched so that a group of stores are performed on one bank and a group of loads are performed to the other bank. Thus, delays from switching between loads and stores are minimized since groups of operations are performed sequentially, while the data flowing into and out of the cache as a whole is equal, since one bank is performing stores while the other is performing loads.

The near cache collision avoidance mode determines the relative locations of the source and destination addresses within the cache. If the source address is slightly after the destination, then the enhanced mode will function properly. If the destination address is slightly after the source address, then groups of cache lines is loaded into registers, and then the registers are stored to memory without any interleaving of other loads and stores.

The exact cache collision avoidance mode restructures the loop of moving data to form a series of loads to get several cache lines staged for loading, each element of data is not only moved into the cache, but into registers. This is pipelined so that after this initial set of loads is performed, then additional loads are interleaved with non-cache conflicting stores to move new values into memory. By separating the time of the loads and stores for matching cache lines, full pipelining and multi-entry cache benefits is obtained.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 depicts the results of using the inventive enhanced cache data mode with the system of FIG. 1;

FIG. 4 depicts a data cache line with data elements;

FIG. 5 depicts a cache collision occurring wherein multiple memory addresses map to the same cache address; and FIG. 6 depicts the results of using the inventive near cache collision avoidance mode with the system of FIG. 1.

DESCRIPTION OF THE PREFERRED EMBODIMENTS

Figures 1, 2:
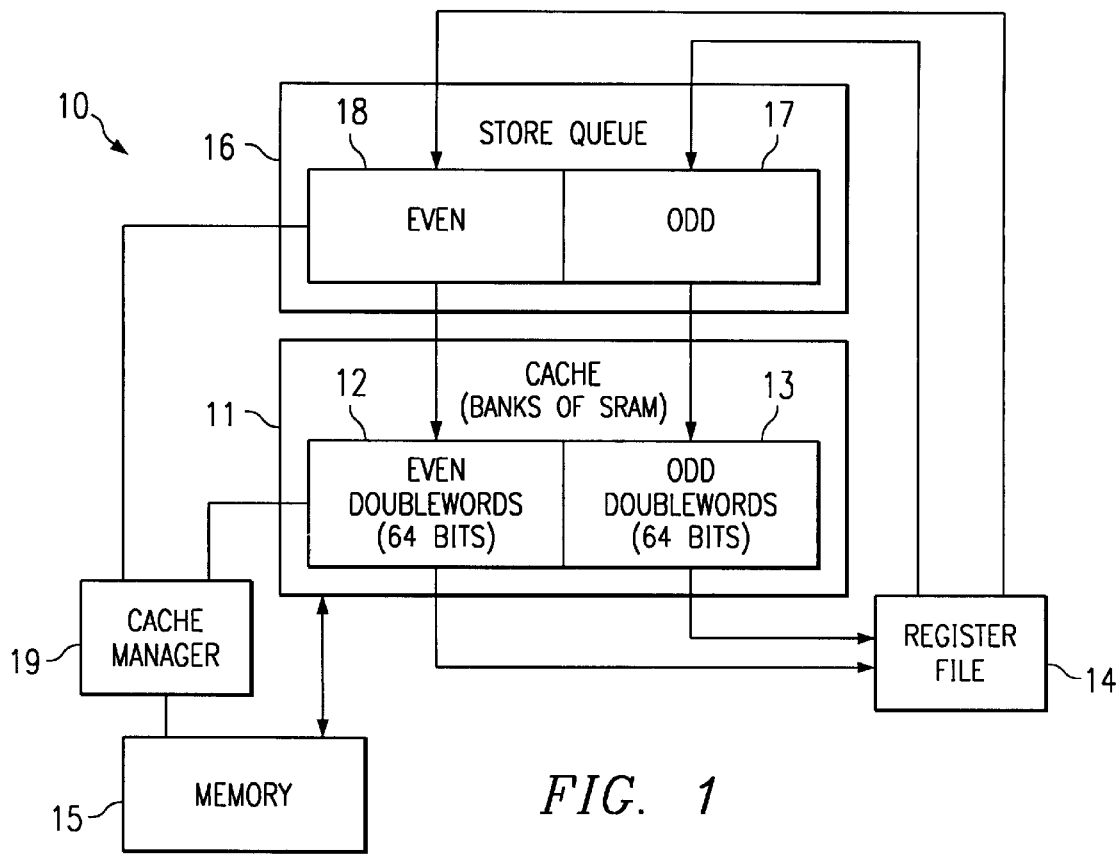
FIG. 1 depicts a computer system using the inventive mechanism.
FIG. 2 depicts the results of using the prior art cache data mode with the system of FIG. 1.

FIG. 1 depicts a representative computer system 10 in which the inventive mechanism operates. System 10 includes cache 11 which is comprised of banks of RAM devices. Cache 11 is organized into two banks, the even numbered double words 12 and the odd numbered double words 13. Cache 11 is connected between the processor register file 14 and the memory 15, via various ports. In this arrangement, store data from the register file 14 actually goes into the store queue 16 before being stored into cache 11. However, other arrangements could be used. Note that there are two banks of the queue 16, an even bank 18 and an odd bank 17, which correspond to the even 12 and odd 13 sides of the cache 11. Again, other arrangements could be used, for example, the cache and the queue could both be arranged in multiple sections. System 10 also includes the cache manager 19, which monitors and controls the flow of data into and out of the cache 11. Note that the flow of data occurs as follows, data is first loaded from the memory 15 into the cache 11. The data is then loaded into the register file 14, whereupon it is manipulated by the processor (not shown). After processing, the data is returned to the cache 11, via the store queue 16. If no further processing is required on the data, or other data has a higher priority, then the data is stored back to the memory 15.

When the data is first being loaded into the cache 11 from memory 15, cache manager 19 determines whether there is a cache address match among the data being loaded. The memory source address and memory destination addresses are analyzed to determine where they would map in the cache. Note that the term "load" refers to moving data from memory to cache or cache to the register file. The term "store" refers to moving data from the register file to cache or cache to memory.

The memory addresses are subtracted and the absolute value of the subtraction is obtained. The modulus based on the cache size is computed from the obtained value. If the result is equal to zero which indicates the addresses have an exact match in cache mapping, then the data flow operates according to an exact cache collision avoidance mode, which will be described later in detail. If either the result is less than a threshold value or the difference between the result and the cache size is less than a different threshold value then the addresses have a near match in cache mapping. When that happens, the data flow operates according to a near cache collision avoidance mode which will be described later in detail. The threshold values are predetermined according to the size of the cache and the number of cache lines used.

The enhanced cache bank conflict avoidance software technique uses opportunistic stores to minimize processor stalls by preventing the store queue from filling up as quickly. In the system shown in FIG. 1, assume that only one store may be executed in a cycle. Moreover, since data cache 11 is organized into two sections or banks, each bank is able to support a memory operation during each cycle. Also assume that a cycle of delay is required between a read (load) operation and a write (store) operation to the same bank. The prior art method of having alternating reads and writes to each bank would cause multiple conflicts to occur because of the delay cycles.

FIG. 2 depicts the results of the prior art method operating with the system of FIG. 1. The prior art would access the cache banks or memory consecutively. FIG. 2 depicts the use of a mem_move command, which is a primitive library function that moves data from one location to another, or copies data. These locations reference memory and use various combinations of registers and cache. The calling sequence of mem_move provides a source address, the destination address, and the number of bytes to be moved. As stated earlier, a load is removing data from the cache and a store is inserting data into cache, and the system of FIG. 1 requires one cycle of delay, known as a dead cycle 23, when the cache is switching from a read to a write mode. FIG. 2 is divided into even and odd columns which represent the movement of data in the even and odd banks of the cache. Note also that the data is divided into tag and data bits. On each clock cycle, within each bank, loads, represented as Lx(i) 21, are alternated with stores, represented as Sy(j) 22. If FIG. 1 were to be comprised of a single bank of cache, only one of the even and odd columns would be needed. If FIG. 1 were to be comprised of more than two banks, additional columns would be present.

Thus, in cycle 1, even cache address 12 is loading tag and data to registers, and odd cache address 1 is loading to tag. Assume that during the prior cycle, an odd cache address was loading tag and data. Thus, the next cycle must be dead, and no data can be stored. In cycle 2, even cache address 2 is loading tag only, and odd cache address 13 is loading tag and data. Since the prior even operation in cycle 1 was a load, the next cycle must be dead, and thus no data can be stored. Each time the data cannot be stored to cache, the data remains in the store queue, which will quickly fill up, and thus cause the processor to stall.

FIG. 3 depicts the results of the inventive enhanced mode operating with the system of FIG. 1. Loads are represented as Lx(i) 31, and stores are represented as Sy(j) 32. If FIG. 1 were to be comprised of a single bank of cache, only one of the even and odd columns would be needed. If FIG. 1 were to be comprised of more than two banks, additional columns would be present. Also note that when the even bank is loading, the odd bank is storing. The enhance mode has several loads to the same bank on one side and several stores for the opposite banks occurring sequentially. Therefore, fewer dead cycles 33 occur, with a required dead cycle occurring at a switch point from a load to a store.

This leads to a significant increase in performance, because more stores of data can occur and the queue will not fill as quickly, thus, resulting in fewer processor stalls.

Thus, in cycle 1, even cache address 12 is loading tag and data to registers, and odd cache address 1 is loading tag only to. Assume that during the prior cycle, an odd cache address was loading tag and data. Thus, the next cycle must be dead, and no data can be stored. In cycle 2, even cache address 14 is loading tag and data, and odd cache address 3 is loading tag and odd cache address 1 is storing data. The Sy(1) is an opportunistic store 34. The store queue uses what would have been a dead cycle, as in FIG. 2, to store data to the cache. The store queue uses idle cycles or cycles when other stores are performing tag look-ups to perform writes to the cache. Note that at clock cycle 4, the odd cache loads the tag for address 7 and stores the data for address 5. In clock cycle 5, the odd stores are switched to load so that the data for address 5 remains in the queue. Alternatively, the data for address 1 could remain in the queue, with the second cycle storing the data for address 3 instead of 1. Note that opportunistic stores 34 occur for Sy(1), Sy(3), and Sy(5). At clock cycle 5, the even bank switches to stores, and incurs a one dead cycle cost, but in cycles 6-8 is able to opportunistically store 34 Sy(2), Sy(4), Sy(6). Also at clock cycle 5, the odd bank switches to loads and loads the tag and data as shown.

FIG. 3 only shows unrolling in groups of four, but actually it could be unrolled for as many registers as in the system. As compared with FIG. 2, FIG. 3 has 6 fewer dead cycles, and has stored more data to cache. In FIG. 2 none of the stores were being performed opportunistically, which would cause the store queue gets fill up faster and stall the processor sooner than in FIG. 3. The inventive enhanced mode maintains the advantage of pairing loads and stores and adds the advantage of not interleaving loads and stores to a particular cache bank. The inventive mechanism would be of benefit in any multi-bank memory system, which uses multi-operation loads and stores per cycle, combined with data buses which require delays between reads and writes to a particular memory bank. Note that the inventive mechanism is applicable whether or not computation is performed between loading data from memory and storing it back to memory.

The enhanced mode deals with data that was already in cache and moving the data between the cache and registers. The near cache collision avoidance mode and the exact cache collision avoidance mode dealing with moving data from memory to cache and then from cache to registers. As shown in FIG. 4, each cache line 40, holds several data elements 41 and the processor can support overlapping operations of several cache line loads or stores at the same time. That means the processor initiates a load or a store, but does not have to wait for the load or store to complete. It can continue with other operations, including having several loads or stores running at the same time so that they overlap. For example, the processor may hold four 8-byte data elements 41 in each cache line and can support ten overlapping memory operations. Each operation may take approximately 90 processor clocks to fetch data from memory to cache, and can initiate four instructions in a single processor clock. There is a large of amount of time to do processor work while waiting for a particular memory line to come in, thus it is very important to overlap loads and stores.

As stated earlier, the manager 19 tests to see if the source and destination addresses have an exact cache address match. If there is an exact match, then the copy loop is unrolled so that several cache lines of duty are handled as a group, and software pipelined so that a series of loads are performed to get several cache lines staged for loading. Then, after each value is stored, a new value is loaded. This method separates by time the loads and the stores of the same cache lines, allowing the benefits of the processor's pipelining and multi-entry caches to be used.

An exact match occurs when the source and destination addresses map to exactly the same cache line, in other words they are exactly a full cache size apart, or a multiple of full cache size apart. As shown in FIG. 5, memory lines 0 51, C 52, 2C 53, and 3C 54 all map to cache line 0 55, while memory lines C-1 56, 2C-1 57, 3C-1 58, and 4C-1 59 all map to cache line C-1 60. The prior art approach of interleaving loads and stores will cause repeated cache collisions, so that instead of getting four data elements of use out of every cache line, only one data element of use before having to reload that cache line. In other words, this prevents the multiple data elements from being reused without additional memory operations. Interleaving loads and stores issues a load and then a store aligned to be in the same processor clock cycle. For example, suppose the processor supports a maximum of one store per cycle and either one or two loads per cycle. Therefore, it is important for maximum performance to alternate loads and stores so that every cycle has a load and a store, otherwise it would take more cycles to get a specific piece of code to complete.

To avoid the cache collisions that occur when there is an exact mapping of source and destination addresses, the manager 19 loads the data from memory that would fill multiple cache lines into different registers, via the cache, to start a pipelined copy operation. This initial load occurs before the pipelining begins. The initial load clears the cache of data which would collide. The initial load uses perhaps as many as 16 registers, so that four cache lines of data would be moving from memory into the cache, and then into the registers at the same time.

Pipelining is an operation where multiple activities are occurring with different stages of completion. For example at a same unit of time a first operation would be almost finished, the second operation would be executing, and a third operation would be just beginning. During the next unit of time, the first operation has completed, the second would be completing, the third would be in the executing, and the fourth would be starting. Thus, even though each operation might take 3 cycles, a completion is attained on every cycle with a pipelined operation. This is by way of example only, as other results are possible and more cycles may be required for completion.

After the initial load, a pipeline is set up where the data from the initial load is moved back to the cache via the store queue. At the same time other data is loaded from memory into the registers, via the cache. Thus, while storing that same data, the store is being overlapped with a load of new data into the register that just stored out the data back to the destination memory address. Once the store is executed, then that same register can be used to load new data, and thus, cache collisions are avoided since the destination at the time of store is to addresses that have already completed their usage as loads, so there will be no conflict between the loads and stores. The main loop in this pipeline consists of interleaving the storing of data from registers, with loading those registers with fresh data from the next group of cache lines. Since the destination cache lines for the stores in the cache do not match the source cache lines for the next block of data, all data elements of each cache line can be used without conflict. Note that data is stored back to cache from the registers before it returns to memory, and that data in the cache will actually remain until that cache line is needed at some future time for another load. Since the cache lines do not conflict, the loads and stores operate in a fully overlapped and pipelined mode by the processor. In order to get the maximum performance, the loads of even cache lines are matched with stores of odd cache lines to avoid the cache bank conflict as described earlier as the enhanced mode.

As stated earlier, the manager 19 tests to see if the source and destination addresses have a near cache address match. If a near match occurs, the mechanism used will depend upon the relative location of the source and destination addresses. If a near match occurs and source address is slightly after the destination, then the enhanced mode, as discussed above, will function properly. However, if the destination address is slightly after the source address, then both the prior art offset interleaving of loads and stores and the enhanced mode will cause collisions. In this case, it is necessary for the manager 19 to load data for a group of cache lines into registers, and then store the registers to memory without any interleaving of other loads and stores. FIG. 6 depicts the results of this mode.

For example, 32 elements are loaded into registers and then before loading any more values, all 32 elements are stored back to memory without any interleaving of additional loads and stores. This mode is performed because of the extremely high cost of collisions. Note that the physical source and destination address might be greatly distant from each other in memory. However, it is the mapping to the cache that is the concern.

Note that data prefetching is a technique supported by modern processors to allow data to be prestaged to the cache from memory without actually consuming processor registers. Data prefetching is used for large data copies to prestage the data into the cache. The data is typically prefetched hundreds of bytes ahead of where it is actually used, or dozens of cycles of loop iterations before it is used. Because data prefetching puts data in the cache before it is needed, it has an increased chance of causing cache collisions. If there is a potential for cache collision, either an exact match or a near match case, prefetching should not be used.

Although the application has centered on copying vectors from one area of the cache to another, this technique can be applied in any code that performs store operations, including assembly code.

Although the present invention and its advantages have been described in detail, it should be understood that various changes, substitutions and alterations can be made herein without departing from the spirit and scope of the invention as defined by the appended claims.

What is claimed is:

1. A method for moving data between a cache and a register file, wherein the cache comprises at least two banks, the method comprising:
   (a) performing a plurality of first cache operations in one bank then performing step (c);
   (b) performing a plurality of second cache operations in another bank then performing step (d);
   (c) performing another plurality of second cache operations in the one bank;
   (d) performing another plurality of first cache operations in the another bank; and
   (e) repeating the steps (a), (b), (c), and (d) until a predetermined condition occurs;
   wherein both of the first cache operations consists of one of a plurality of load operations and a plurality of store operations, and both of the second cache operations consists of the other of the plurality of load operations and the plurality of store operations and wherein steps (a) and (b) are performed substantially simultaneously and steps (c) and (d) are performed substantially simultaneously.

2. The method of claim 1, wherein:
the predetermined condition is a completion of cache operations.

3. The method of claim 1, further comprising the step of:
processing the data after the completion of steps (a) and (d) operations.

4. The method of claim 1, further comprising the step of:
manipulating the data after the completion of the steps (a) and (d) operations.

5. The method of claim 1, wherein:
all of the first and second cache operations are ordered so as to reduce a number of delay cycles.

6. The method of claim 1, wherein:
all of the first and second cache operations are ordered such that opportunistic store operations occur.

7. A system for moving data between a cache and a register file, wherein the cache comprises at least two banks, the system comprising:
   first means for performing a plurality of first cache operations in one bank;
   second means for performing a plurality of second cache operations in another bank;
   third means for performing another plurality of second cache operations in the one bank; and
   fourth means for performing another plurality of first cache operations in the another bank;
   wherein the first, second, third, and fourth means operate until a predetermined condition occurs, and both of the first cache operations consists of one of a plurality of load operations and a plurality of store operations, and both of the second cache operations consists of the other of the plurality of load operations and the plurality of store operations, and wherein said first and second means operate substantially simultaneously, said third and fourth means operate substantially simultaneously, said third means operates after said first means, and said fourth means operates after said second means.

8. The system of claim 7, wherein:
the predetermined condition is a completion of cache operations.

9. The system of claim 7, further comprising:
means for processing the data after the operation of the first means, second means, third means, and fourth means.

10. The system of claim 7, further comprising:
means for manipulating the data after the operation of the first means, second means, third means and fourth means.

11. The system of claim 7, wherein:
all of the first and second cache operations are ordered so as to reduce a number of delay cycles.

12. The system of claim 7, wherein:
all of the first and second cache operations are ordered such that opportunistic store operations occur.

13. A method of moving data associated with a cache of a processor, wherein said cache comprises at least two banks, comprising:
 (a) receiving a plurality of memory operations by a cache manager of said cache;
 (b) identifying a plurality of load operations from said plurality of memory operations that are associated with a first bank of said at least two banks;
 (c) identifying a plurality of store operations from said plurality of memory operations that are associated with a second bank of said at least two banks;
 (d) loading data associated with said plurality of load operations from said first bank of said at least two banks; and
 (e) storing data associated with said plurality of store operations in said second bank of said at least two banks;
 wherein steps (d) and (e) are performed substantially concurrently.

* * * * *